United States Patent [19]

Nagasaki et al.

[11] Patent Number: 5,153,731
[45] Date of Patent: Oct. 6, 1992

[54] SOLID STATE IMAGE PICK-UP DEVICE AND APPARATUS CAPABLE OF PROVIDING FILTERING OUTPUT WITH DIRECT AND REAL TIME MANNER

[75] Inventors: Tatsuo Nagasaki; Kenji Kishi, both of Yokohama, Japan

[73] Assignee: Olympus Optical Co., Ltd., Tokyo, Japan

[21] Appl. No.: 627,043

[22] Filed: Dec. 13, 1990

[30] Foreign Application Priority Data

Dec. 18, 1989 [JP] Japan .................................. 1-325877
Dec. 18, 1989 [JP] Japan .................................. 1-325878

[51] Int. Cl.⁵ .......................................... H04N 5/335
[52] U.S. Cl. ........................ 358/213.11; 358/213.29; 358/213.31; 358/213.15; 357/24
[58] Field of Search ..................... 358/213.11, 213.23, 358/213.25, 213.26, 213.29, 213.31, 213.17, 43, 44; 357/24 LR

[56] References Cited

U.S. PATENT DOCUMENTS

| | | | |
|---|---|---|---|
| 3,940,602 | 2/1976 | Lagnada et al. | 358/213.29 |
| 4,392,154 | 7/1983 | Horii | 358/213.31 |
| 4,577,233 | 3/1986 | Kimata | 358/213.31 |
| 4,920,428 | 4/1990 | Lin et al. | 358/213.15 |
| 4,926,247 | 5/1990 | Nagasaki et al. | 358/43 |

OTHER PUBLICATIONS

"Digital Image Processing", W. K. Pratt, University of So. California, 1978, pp. 307–321.

Primary Examiner—John K. Peng
Assistant Examiner—Glenton B. Burgess
Attorney, Agent, or Firm—Frishauf, Holtz, Goodman & Woodward

[57] ABSTRACT

A solid state image pick-up device includes a solid state image pick-up body and two-dimensional filtering sections. The solid state image pick-up device body includes a plurality of semiconductor photoelectric sections and parallel transfer sections. The plurality of semiconductor photoelectric sections are arranged as a matrix, having a plurality of pixels to store the signal charges corresponding to the quantity of incident light. The parallel transfer sections are given corresponding to the pixels in order to parallel transfer and output the signal charges stored in the semiconductor photoelectric sections in lines. The two-dimensional filtering section is integrated in the output section of the solid state image pick-up device body in order to directly apply a predetermined two-dimensional filtering to the signal charges output from the solid state image pick-up device body.

10 Claims, 8 Drawing Sheets

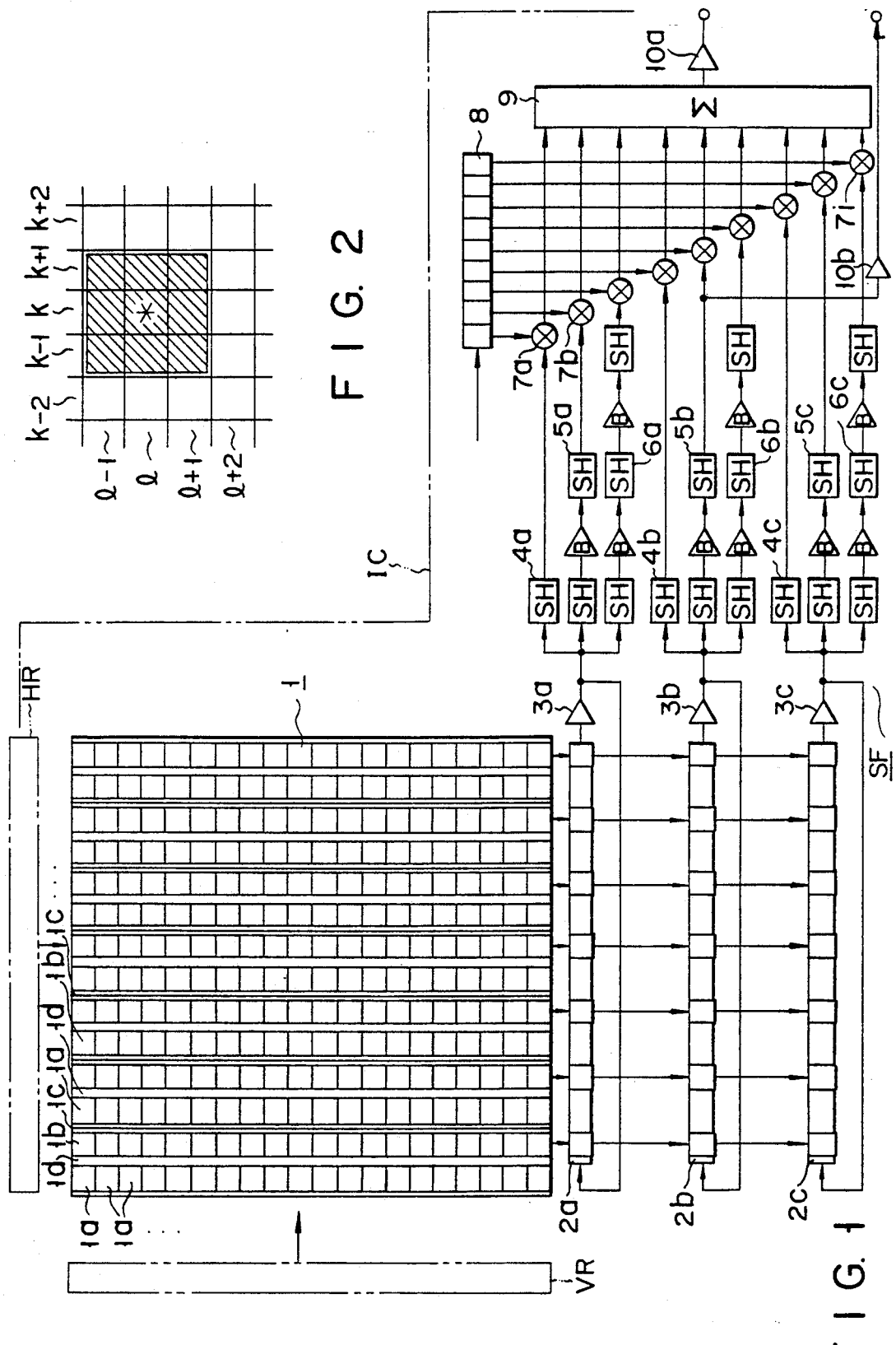

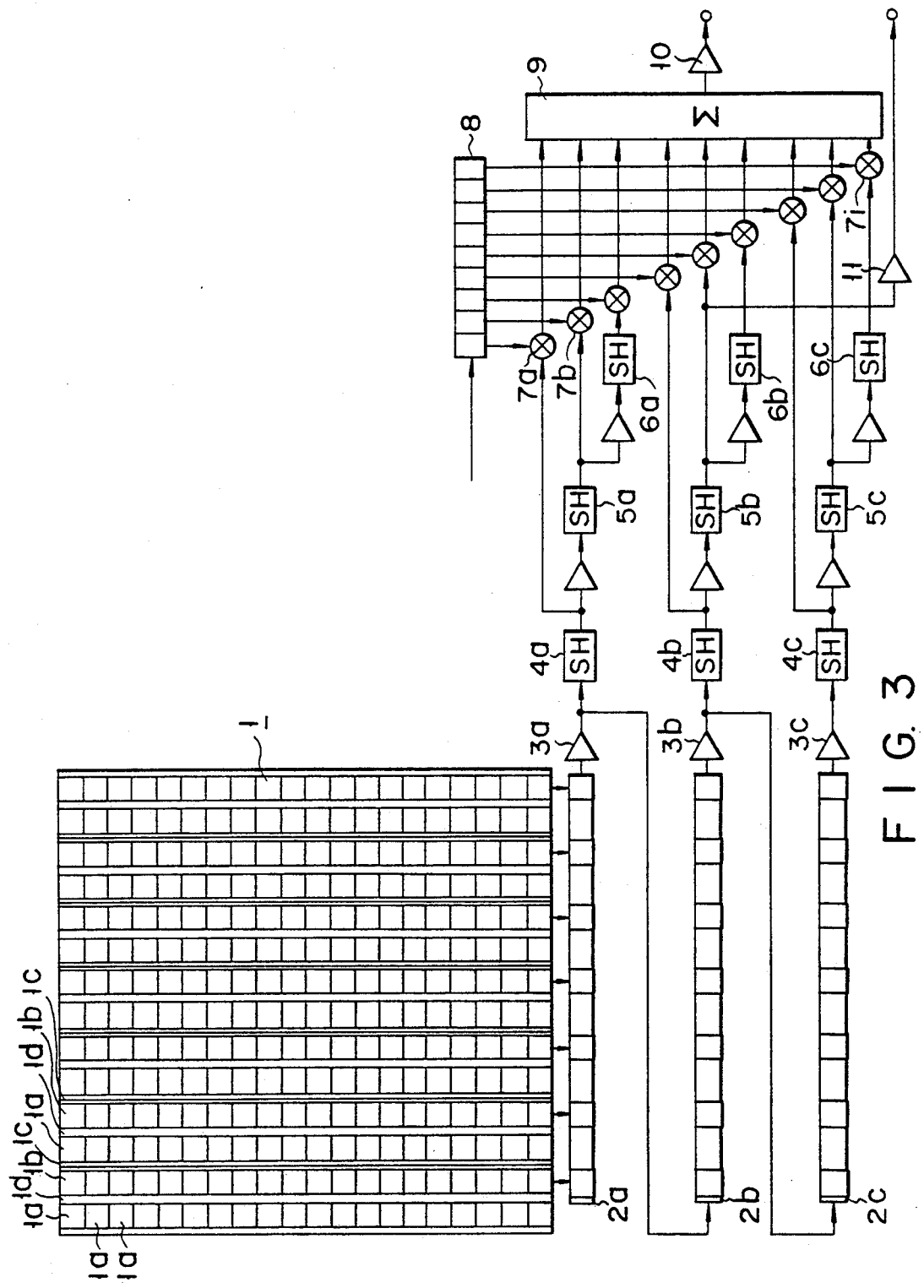

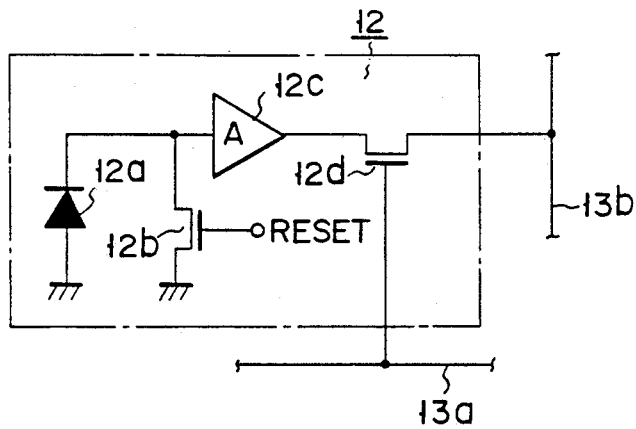
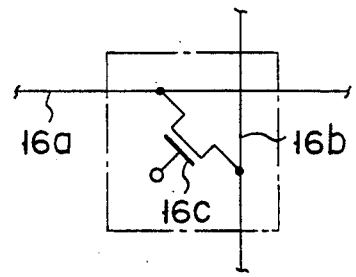
F I G. 5
F I G. 6
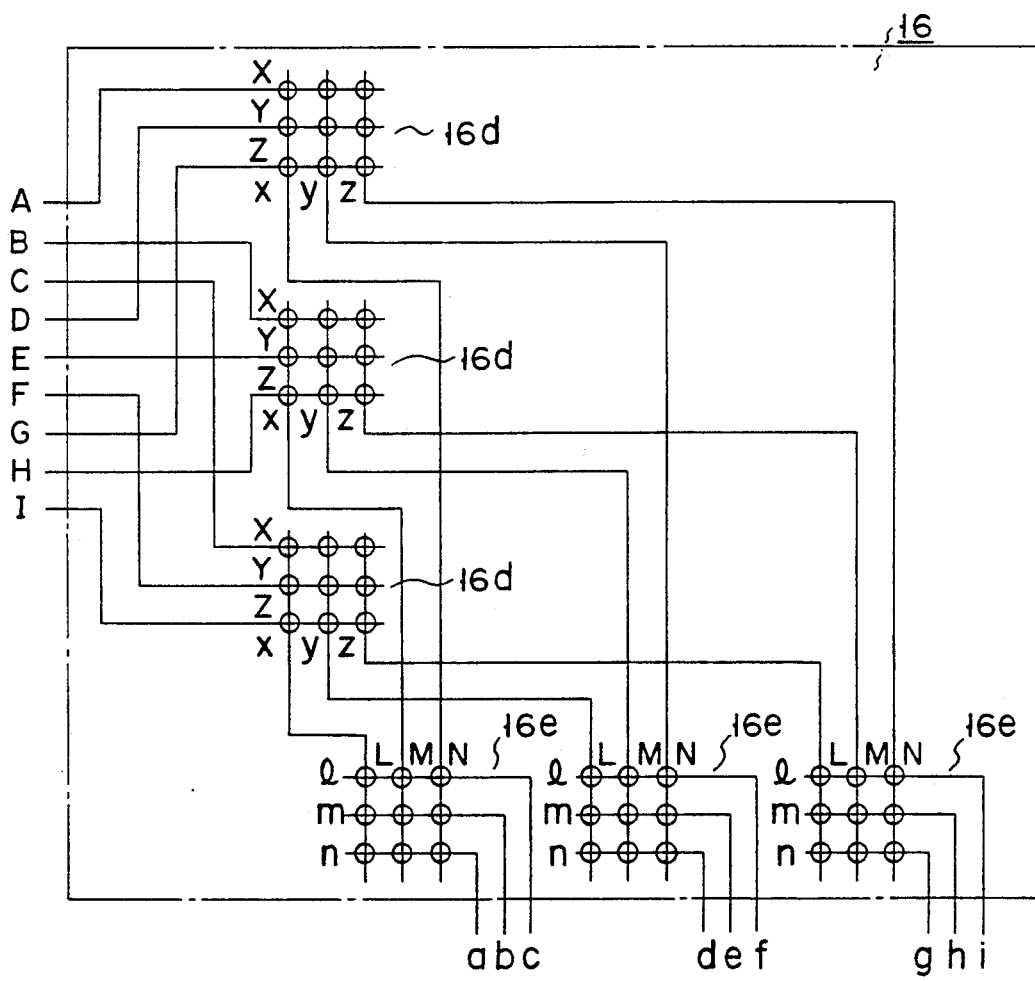
F I G. 7

|  D  |     |     |
|-----|-----|-----|
| 0.0 | 1.0 | 2.0 |
| 0.1 | 1.1 | 2.1 |
| 0.2 | 1.2 | 2.2 |

FIG. 9A

|  C  |     |     |
|-----|-----|-----|
| 0.0 | 1.0 | 2.0 |
| 0.1 | 1.1 | 2.1 |
| 0.2 | 1.2 | 2.2 |

FIG. 9B

| a | d | g |
|---|---|---|
| b | e | h |
| c | f | i |

FIG. 10A

| −1 | −1 | −1 |
|----|----|----|
| −1 |  8 | −1 |
| −1 | −1 | −1 |

FIG. 10B

SOLID STATE IMAGE PICK-UP DEVICE AND APPARATUS CAPABLE OF PROVIDING FILTERING OUTPUT WITH DIRECT AND REAL TIME MANNER

BACKGROUND OF THE INVENTION

1. Field of the Invention

The present invention generally relates to a solid state image pick-up device and apparatus and, more particularly, to a solid state image pick-up device having the two-dimensional filtering function and providing video signals filtered in real time.

2. Description of the Related Art

Recently, various techniques have been developed to electronically pick-up objects by using a solid state image pick-up device such as CCD and MOS image sensors, which are realized as video cameras and electronic still cameras.

This type of solid state image device (image sensor) basically comprises several photoelectric sections arranged as a matrix to sequentially read signal charges generated and stored in response to the quantity of incident light by each photoelectric section in time series through a signal-charge transfer unit (transfer register). The solid state image pick-up device such as a MOS image sensor has the function to hold the signal charges stored in photoelectric section and deletes the signal charges stored in the sections by receiving the reset signal which is separately given independently of reading of signal charges stored in the sections.

Therefore, when treating video signals obtained through the above image sensor, two-dimensional highpass filtering to extract the edge component of images by obtaining the differential value between adjacent pixels and two-dimensional filtering to correct uneven illumination are frequently used as image signal processing. The two-dimensional filtering is basically made by executing convolute integration between a noticed pixel, several ambient pixels of it, and prescribed weighting factor. That is, the two-dimensional filtering is conventionally generally realized by storing the pixel signals read in time series from a solid state image pick-up device in shift registers for "n" lines, obtaining (n×m) pixel signals by applying retardation processing to the pixel signals obtained from each shift register, and multiplying each signal by the prescribed filter factor to obtain the total sum.

The CCD image sensor is configured so that each of said signal charges will be read in time series by vertically transferring the signal charges stored in several photoelectric sections for each column respectively and horizontally transferring the signal charges read in lines at the output end. The MOS image sensor is configured so that each of said signal charges will be read in time series by sequentially designating photoelectric sections in a matrix in the line and column directions.

However, to make the two-dimensional filtering circuit to apply two-dimensional filtering to the video signals (signal charges) read from the above sensors in time series as a dedicated hardware circuit and obtain the required filtering output by externally connecting the circuit to the output stage of a solid state image pick-up device, a large-scale image processor is necessary. Moreover, there is a disadvantage that filtering output cannot be obtained in real time.

Therefore, in the prior art, there are disadvantages that a dedicated two-dimensional filtering circuit should be made as an outside circuit of said solid state image pick-up device in order to apply two-dimensional filtering to the video signals obtained from the solid state image pick-up device, a large-scale image processor is necessary, and no filtering output can be obtained in real time.

SUMMARY OF THE INVENTION

It is, therefore, an object of the present invention to provide a new and improved solid state image pick-up device in which high practicability is shown by simplifying the treatability so that required filtering output can directly be obtained from the solid state image pick-up device installed on the photoelectric surface in real time.

It is another object of the present invention to provide a solid state image pick-up device with high treatability and practicability capable of directly obtaining the filtering output for video signals from the solid state image pick-up device, especially a MOS image sensor, installed on the photoelectric surface.

According to an aspect of the present invention, there is provided a solid state image pick-up device comprising:

a solid state image pick-up device body comprising:

a plurality of semiconductor photoelectric sections arranged as a matrix having a plurality of pixels to store signal charges corresponding to the quantity of incident light; and a parallel transfer means provided by corresponding to the plurality of pixels in order to parallel transfer and output the signal charges stored in the plurality of semiconductor photoelectric sections in lines; and two-dimensional filtering means integrated in the output section of the solid state image pick-up device body in order to directly apply a predetermined two-dimensional filtering to the signal charges output from the solid state image pick-up device body.

Concretely, the present invention is characterized by the fact that the signal charges parallel transferred in lines from the photoelectric sections are stored in "n" consecutive lines of the output stage of a solid state image pick-up device to parallel transfer the signal charges stored in the photocells in lines from the photoelectric sections arranged as a matrix as the two-dimensional filtering means; and that n-stage transfer registers to serially transfer and output the signal charges in each line, a delaying means to delay the signal charges serially transferred and output from each of the n-stage transfer registers and parallel output "m" consecutive pixels for each line, several multipliers to multiply each signal charge for n-stage "m" pixels obtained from the delaying means by each prescribed factor, and an adder to obtain the total sum of the products calculated by the multipliers are simultaneously integrated.

According to the above configuration, it is possible to store the signal charges parallel transferred in lines from the plurality of photoelectric sections arranged as a matrix in "n" consecutive lines, extract the signal charges for "m" consecutive pixels in each line while parallel reading each signal charge in the "n" lines in time series using n-stage registers to serially transfer and output the signal charges in each line, and obtain the signals filtered in real time using these signals for (n×m) pixels as the output of the solid state image pick-up device.

As the result, it is possible to directly obtain the required filtering output in real time from the solid state image pick-up device without making a dedicated hardware two-dimensional filtering circuit as an outside circuit. Therefore, the treatability can adequately be improved.

A solid state image pick-up apparatus related to another aspect of the present invention is characterized by the fact that a photoelectric section designating means is given to selectively designate line positions every "n" consecutive lines of a plurality of photoelectric sections arranged as a matrix to form a photoelectric surface and provided with the function to hold signal charges independently of reading the signal charges by shifting over the lines one by one and selectively designate column positions every "m" columns of the photoelectric sections by shifting over the columns one by one; the signal corresponding to the signal charge stored in each photoelectric section of "n" lines and "m" columns designated by the photoelectric section designating means are parallel read through (n×m) signal reading conductors; the signals from each photoelectric section of "n" lines and "m" columns read through each signal reading conductor are rearranged according to the positional relation of each photoelectric section of the "n" lines and "m" columns through switch matrix; each signal is multiplied by each prescribed factor using several multipliers; and the products obtained by these multipliers are totaled by an adder.

The solid state image pick-up apparatus is also characterized by the fact that the photoelectric sections, photoelectric section designating means, signal reading conductors, switch matrix, multipliers, and adder are integrated on the same semiconductor substrate.

In the configuration, line positions of several photoelectric sections arranged as a matrix are selectively designated every "n" consecutive lines by shifting over the lines one by one and the column positions of the photoelectric sections are selectively designated every "m" consecutive columns by shifting over the columns one by one, the signal charges stored in the photoelectric sections are parallel read through (n×m) signal reading conductors, and the train of the signal charges parallel read through the signal reading conductors are rearranged according to the positional relation of the n-line m-column photoelectric sections for multiplication with filtering factors through the switch matrix to execute two-dimensional filtering using the signal charges. Therefore, it is possible to very simply and effectively execute two-dimensional filtering.

Also, by forming these circuit functional sections and photoelectric sections into an IC to realize a solid state image pick-up device, it is possible to directly obtain the required filtering output from the solid state image pick-up device in real time without making a dedicated hardware two-dimensional filtering circuit as an outside circuit. As the result, the treatability can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic bock diagram of the photocells related to the first embodiment of the present invention;

FIG. 2 is a conceptual drawing of picture elements to execute two-dimensional filtering;

FIG. 3 is a schematic block diagram of the photocells related to the second embodiment of the present invention;

FIG. 5 shows the configuration of the photoelectric sections of the device in FIG. 4;

FIG. 6 is a drawing showing the switch elements composing the switch matrix of the device in FIG. 4;

FIG. 7 shows the configuration of the switch matrix of the photoelectric device related to the fourth embodiment of the present invention; and FIGS. 8 through 12 are drawings to describe examples of "3×3" two-dimensional filtering.

DETAILED DESCRIPTION OF THE PREFERRED EMBODIMENTS

Figure 4:
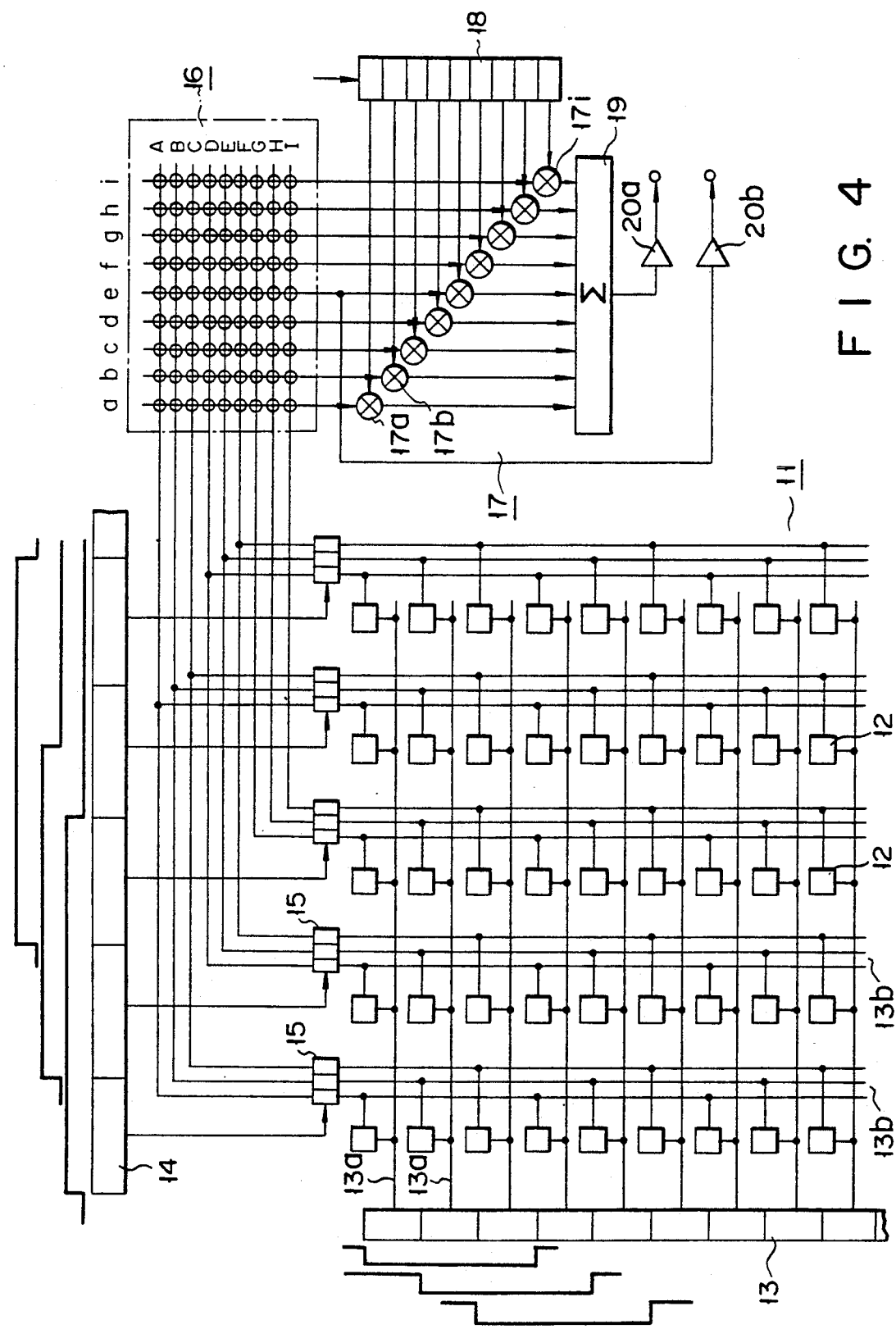
FIG. 4 is a schematic block diagram of the solid state image pick-up device related to the third embodiment of the present invention.

Reference will now be made in detail to the presently preferred embodiments of the invention as illustrated in the accompanying drawings, in which like reference characters designated like or corresponding parts throughout the several drawings.

The following is the description of the solid state image pick-up devices related to the first and second embodiments of the present invention according to FIGS. 1 through 3.

FIG. 1 is a schematic block diagram of the solid state image pick-up device related to the first embodiment, in which number 1 represents a solid state image pick-up device body. The solid state image pick-up device body 1 has a fat surface in which a plurality of semiconductor photoelectric sections 1a comprising photodiodes generating the signal charges corresponding to the quantity of incident light are arranged as a matrix as pixels, vertical transfer registers 1b are arranged along each column of these photoelectric sections 1a, and the inter-element separation area 1c is formed for each column-directional single unit made by the photoelectric sections 1a and the vertical transfer registers 1b of each column.

The vertical transfer registers 1b of the each column are controlled by the transfer gate 1d formed between the vertical transfer registers 1b and the photoelectric sections 1a to parallel transfer and input the signal charge stored in each of the photoelectric sections and vertically (downward in the drawing) transfer the signal charges parallel input from each photoelectric section 1a by receiving the vertical transfer clock from the vertical transfer controller shown by a two-dot chain line in the drawing. As the result, signal charges are parallel transferred and output from the solid state image pick-up device body 1 for each line starting with the vertical transfer registers 1b of each of the columns, that is, for each line starting with the signal charge in each photoelectric section 1a at the bottom line of several photoelectric sections 1a arranged as a matrix.

Thus, the signal charges parallel transferred and output every line are parallel input to the output end of each of the vertical transfer registers 1b, and the two-dimensional filtering function sections SF are installed in the same IC through "n"-stage (three stages in this case) horizontal transfer registers 2a, 2b and 2c which horizontally transfer the input signal charges in the traverse direction. That is, as shown in FIG. 2, horizontal transfer registers are installed in three stages of 2a, 2b and 2c in order to execute two-dimensional filtering according to the pixel signal in the (3×3) picture-element area covering three pixels of three consecutive lines and store the signal charges parallel obtained in lines from the solid state image pick-up device body 1 in three consecutive lines. That is, in this embodiment, signal charges at the ($\lambda-1$)-th line, $\lambda$-th line, and ($\lambda+1$)-th line are stored for one line respectively in order to execute two-dimensional filtering by assuming the k-th pixel at the $\lambda$-th line as the noticed pixel and referencing (3×3) pixels around it.

The horizontal transfer registers 2a, 2b and 2c are driven by receiving the horizontal transfer clock sent from the horizontal transfer controller HR shown by a two-dot chain line in the drawing (see the horizontal register 14 in FIG. 1), to horizontally (rightward in the drawing) transfer the parallel-input signal charges for one line. In this case, the signal charges output from the horizontal transfer registers 2a, 2b and 2c are returned to the left end of each register through the buffers 3a, 3b and 3c, and cyclically transferred and controlled in the horizontal transfer registers 2a, 2b and 2c respectively. When one cycle of serial transfer of the signal charges for one line is completed, the signal charges for one line in each of the horizontal registers, 2a, 2b and 2c are parallel output to the next stage synchronously with the parallel output of signal charges for each line sent from the solid state image pick-up device body 1.

By the output control, the signal charges for one line (e.g. the ($\lambda+1$)-th line) stored in the horizontal transfer register 2a are parallel transferred to the horizontal transfer register 2b. In this case, the signal charges for one line at the $\lambda$-th line are parallel transferred to the horizontal transfer register 2c. And the signal charges for one line at the ($\lambda-1$)-th line stored in the horizontal transfer register 2c are ejected and the signal charges at the ($\lambda+2$)-th line are stored in one line of the horizontal transfer register 2a.

As the result, the signal charges stored in one line of horizontal transfer registers 2a, 2b and 2c respectively are shifted for one line. In this case, the signal charges, as previously mentioned, are serially read from the horizontal transfer registers 2a, 2b and 2c respectively by means of serial transfer through the buffers 3a, 3b and 3c.

For the horizontal transfer register 2c at the third stage (final stage), it is unnecessary to reuse the signal charges parallel input in the register after they are serially transferred. Therefore, it is also possible to omit feedback input of the signal charges serially transferred and output to the front end so that cyclical transfer will not be executed.

Thus, the first sample-hold circuits (SH) 4a, 4b and 4c to respectively sampling-hold signal charges synchronously with the serial transfer timing, the second sampling-hold circuits (SH) 5a, 5b and 5c to respectively sampling-hold the signal charges after delay of one sample, and the third sample-hold circuits (SH) 6a, 6b and 6c respectively sampling-hold the signal charges after delay of two samples are installed at the signal ends to serially output signal charges from the horizontal transfer registers 2a, 2b and 2c through the buffers 3a, 3b and 3c. In this case, the second sample-hold circuits 5a, 5b and 5c are respectively composed of a two-stage sample-hold circuit directly connected through the buffer (B) and the third sample-hold circuits 6a, 6b and 6c are respectively composed of a three-stage circuit directly connected through the two-stage buffer (B).

Thus, the signal charges for three consecutive pixels of each line previously mentioned or the signal charges for (3 lines×3 pixels) are respectively obtained from the first through third sample-hold circuits 4a through 4c, 5b through 5c, and 6a through 6c parallel installed on the output ends of the horizontal transfer registers 2a, 2b and 2c.

The multipliers 7a, 7b, ... and 7i respectively connected to the first through third sample-hold circuits 4a through 4c, 5a through 5c, and 6a through 6c multiply the signal charges for (3 lines×3 pixels) by the filter factors set in the factor register 8 respectively. The products calculated by the multipliers 7a, 7b, ... and 7i are output to the adder 9 to obtained the total sum of the products. The filter factors are preset to the factor register 8 according to the contents of two-dimensional filtering.

In this case, two-dimensional filtering for (3×3) pixels is executed according to the multiplication using the above filter factors and addition of the products. The output from the adder 9 which is the result of filtering is output to the outside through the output buffer 10a as the filtering output of solid state image pick-up device.

In this case, the sampling output of the second sample-hold circuit 5b is directly output as a normal signal output from the solid state image pick-up device 1 through the output buffer 10b.

The raw signal charge (video signal) picked up by the solid state image pick-up device 1 and the video signal provided with the two-dimensional filtering are mutually synchronously obtained by the outputs of the above two systems. In other words, the two-dimensional filtering output is obtained for the raw video output in real time.

Thus, according to the solid state image pick-up device made by integrating the above circuit functional sections (two-dimensional filtering function) into an IC, the picture signal provided with two-dimensional filtering can be obtained as the output of the device together with the raw picture signal in real time. Moreover, the required filtering output can directly be obtained as the device output only by previously setting the filter factors corresponding to the filtering specification to the factor register 8. Therefore, it is unnecessary to make a two-dimensional filtering circuit as part of a picture processor though the circuit has been necessary so far. Moreover, it is possible to adequately secure the real-time characteristic of the filtered signal and remarkably improve the operability.

It is relatively simple to integrate the two-dimensional filtering function with the solid state image pick-up device 1 by using the current semiconductor manufacturing technique and also to parallel transfer signal charges between the "n"-stage horizontal transfer registers 2a, 2b, 2c, ... 2n. Therefore, there is an advantage that the configuration of a solid state image pick-up device can be simplified. Thus, the configuration of video cameras and electronic still cameras comprising this type of solid state image pick-up device can greatly be simplified.

The above-mentioned embodiment is configured so that the signal charges for one line can parallel be transferred between "n"-stage (three-stage) horizontal transfer registers 2a, 2b and 2c which are installed in parallel. However, it is also possible to realize the configuration as the serially-connected "n"-stage (three-stage) horizontal transfer registers 2a, 2b and 2c of the second embodiment shown in FIG. 3. That is, the configuration is made so that the signal charges serially output from the horizontal transfer register 2a at the first stage will directly be input to the horizontal transfer register 2b at the second stage through the buffer 3a and the signal charges serially output from the horizontal transfer register 2b at the second stage will directly be input to the horizontal transfer register 2c at the third stage through the buffer 3b.

According to the above configuration, it is possible to simplify the driving system and the configuration because it is unnecessary to cyclically and serially transfer the signal charges from the horizontal transfer registers 2a, 2b and 2c.

In this case, the first through third sample-hold circuits to delay the signal charges serially transferred and output from the horizontal transfer registers 2a 2b, and 2c may be realized as the three-stage sample-hold circuits (4a, 5a, 6a), (4b, 5b, 6b) and (4c, 5c, 6c) serially connected through the buffer in order to parallel read the signal charges held by the sample-hold circuit at each stage as shown in the second embodiment of FIG. 3. This decreases the number of sample-hold circuits necessary for delay processing compared with the configuration shown in the first embodiment and simplifies the configuration. Even if the configuration is simplified as mentioned above, the same effect as that of the previous embodiment can be obtained. The solid-stage image pick-up device of the present invention is not restricted to the first and second embodiments.

The first and second embodiments are described by assuming that two-dimensional filtering is executed between signal charges for (3 lines×3 pixels). In general, however, to execute two-dimensional filtering of ("n" lines×"m" pixels), it is permitted to install "n"-stage horizontal transfer registers and "m"-stage delay (sampling circuits). It is also possible to previously set the filter factors to execute two-dimensional filtering as ROM data if the filtering specification is fixedly determined. The present invention can be executed in various forms as long as they follow the gist of the invention.

As described above, according to the present invention, the filtering output can be obtained in integrating the two-dimensional filtering function to apply two-dimensional filtering to signal charges (picture signals) read from the photoelectric sections with the photoelectric sections. Therefore, the required filtering output can be obtained by the very-effectively-assembled two-dimensional filtering function. As the result, great effect for practical use can be obtained because the configuration of video cameras and electronic still cameras using this type of solid state image pick-up device and their treatability can greatly be simplified.

The following is the description of the solid-stage image pick-up apparatus related to the third and fourth embodiments of the present invention according to FIGS. 4 through 12.

FIG. 4 is a schematic block diagram of the solid state image pick-up apparatus related to the third embodiment, in which the number 11 represents the solid-stage image pick-up device body. The solid state image pick-up device body 11 has the configuration in which a plurality of photoelectric sections 12 mainly comprising photodiodes to generate the signal charge corresponding to the quantity of incident light as pixels are arranged as a matrix.

Thus, these photoelectric sections 12 are configured so that they will selectively be designated in lines through the line selecting conductor 13a controlled by the vertical register 13 to output signals corresponding to the signal charges stored in the photoelectric sections to the signal reading conductors 13b arranged in the column direction.

That is, the each photoelectric section 12, as shown in FIG. 5 for example, comprises the photodiode 12a to generate the signal charge corresponding to the quantity of incident light, the MOS switch 12b parallel connected to the photodiode 12a to delete the signal charge stored in the photodiode 12a by receiving the reset signal, the amplifier 12c to generate the signal corresponding to the signal charge stored in the photodiode 12a, and the MOS switch 12d to be turned on by the signal reading command passing through the line selecting conductor 13a to output the signal charge sent from the amplifier 12c to the signal reading conductor 13b.

Therefore in FIG. 4, the vertical register 13 to selectively designate the photoelectric sections 12 for each line is configured so that it can selectively designate the photoelectric sections 12 of three consecutive lines by sequentially shifting over the designating positions one line by one line. The output ends of photoelectric sections selectively designated in lines are cyclically connected to the signal reading conductors 13b which are installed every three conductors along the column of the photoelectric sections 12. As the result, the signal outputs from the photoelectric sections 12 of three lines selectively designated as mentioned above are parallel read to the three signal reading conductors 13b for each column.

The above-mentioned selective designation of the photoelectric sections 12 every three lines are executed by assuming that two-dimensional filtering is executed every pixels for (3 lines×3 columns). Therefore, to generally execute two-dimensional filtering every pixels for ("n" lines×"m" columns), the vertical register 13 is driven to designate the photoelectric sections 12 every "n" lines and the signal reading conductors 13b arranged in the column direction of the photoelectric sections 12 are installed every "n" conductors. The signal outputs from photoelectric sections 12 arranged in the column direction are connected to "n" signal reading conductors 13b so that they will cyclically be read.

Thus, the gate circuit 15 to be selectively switched on by the horizontal register 14 is installed at each output end of three signal reading conductors 13b ("n" conductors in general). The horizontal register 14 switches on this gate circuit 15 every three consecutive columns along the train of the photoelectric sections 12 to selectively read signals from the signal reading conductor 13b. Switch-on of the gate circuits 15 every three columns is shifted one column by one column according to movement of the area to be provided with two-dimensional filtering.

In this case, as previously mentioned, because two-dimensional filtering is executed every pixels for (3 lines×3 columns), the gate circuits 15 are switched on every three columns. However, to execute two-dimensional filtering every pixels for "n" lines×"m" columns, gate control is executed every "m" columns.

The signal reading conductors 13b from each column of the photoelectric sections 12 in which gate control is thus executed are unified every three columns. That is, the signal reading conductors 13b arranged every three conductors along each column of the photoelectric sections 12 are connected in common excluding the signal conductor 13b in which signals are simultaneously read through the gate circuit 15. In this case, the signal conductors are unified into nine conductors corresponding to (3 lines×3 columns). In general, however, they are unified into (n×m) conductors corresponding to ("n" lines×"m" columns).

Thus, the signal charges from the photoelectric sections for the lines designated by the vertical register 13 through the signal reading conductor 13b unified through the gate circuit 15 and for the columns in which the gate circuit is switched on, that is, the signal charges from the photoelectric sections 12 for "n" lines and "m" columns (3 lines and 3 columns in this case) are parallel read. Then, the "n"-line and "m"-column photoelectric sections 12 in which signal charges are read are sequentially shifted one pixel by one pixel under the control by the vertical register 13 and horizontal register 14. The shift control is executed by repeatedly and sequentially shifting over the photoelectric sections 12 arranged as a matrix in the column direction and shifting for one pixel when one-line shift processing is completed throughout the area.

Thus, the signal charges from the 3-line 3-column photoelectric sections 12 parallel read are input to the switch matrix 16 where (9×9) switch circuits are formed. Each switch element of the switch matrix 16 is composed of the MOS switch 16c to selectively connect the line conductor 16a showing a signal input conductor and the column conductor 16b showing a signal output conductor as shown in FIG. 6. The output destination of the signals read through the nine signal reading conductors 13b is determined by selective electrification of the MOS switch 16c. The signal charges from the 3-line 3-column photoelectric sections 12 parallel read through the nine signal reading conductors 13b are converted into the train of the signals corresponding to the positional relation between the pixels by the switch matrix 16 thus configured and output to the two-dimensional filter section 17.

The following is the further detailed description of the function of the switch matrix 16. It depends on the position of the 3-line 3-column photoelectric sections 12 selectively designated by the vertical register 13 and horizontal register 14 which signal reading conductor 13b each signal charge from the 3-line 3-column photoelectric sections 12 parallel read from the solid state image pick-up device body 11 through the nine signal reading conductors 13b is output to.

For example, if assuming that the nine signal reading conductors 13b are classified into A, B, . . . and I, the signal outputs from the signal reading conductors 13b arranged along the first-column photoelectric sections 12 are output to the signal conductors A, B and C; those from the signal reading conductors 13b arranged along the second-column photoelectric sections 12 to the signal conductors D, E and F; and those from the signal reading conductors 13b arrange along the third-column photoelectric sections 12 to the signal conductors G, H and I. And the signal outputs from the signal reading conductors 13b arranged along the fourth-column photoelectric sections 12 are output to the signal conductors A, B and C again and those from the signal reading conductors arranged along the fifth-column photoelectric sections 12 to the signal conductors D, E and F again. Therefore, every three trains of the signals read to the signal conductors A, B, . . . , and I are displaced corresponding to the columns of the photoelectric sections 12 and the sequence changes for the train of columns, depending on the column selectively designated by the horizontal register 14.

Also the signals on every three signal reading conductors 13b arranged along each column of the photoelectric sections 12 cyclically change depending on the line selectively designated by the vertical register 13. Therefore, each signal train on the every three signal conductors changes corresponding to the line selectively designated by the vertical register 13.

The switch matrix 16 replaces the signal train which changes according to the position of the photoelectric sections 12 selectively designated by the vertical register 13 and horizontal register 14 with the train corresponding to three consecutive lines for the output conductors "a", "b", . . . , and "i" of the switch matrix, that is, the positional relation between the (k−1)-th, k-th, and (k+1)-th photoelectric sections 12 in the (λ−1), λ and (λ+1) lines. As the result, the signal charge (picture signal corresponding to signal charge) is always given to the output conductors "a", "b", . . . , and "i" of the switch matrix 16 from the photoelectric sections 12 having the following positional relation of pixels.

The output conduct a; (λ−1) line, (k−1)-th
The output conduct b; (λ−1) line, k-th
The output conduct c; (λ−1) line, (k+1)-th
The output conduct d; λ line, (k−1)-th
The output conduct e; λ line, k-th
The output conduct f; λ line, (k+1)-th
The output conduct g; (λ+1) line, (k−1)-th
The output conduct h; (λ+1) line, k-th
The output conduct i; (λ+1) line, (k+1)-th To control the switch matrix 16 for replacing signal conductors, the selective driving is necessary according to the positions of the line and column of the photoelectric sections 12 selectively designated by the vertical register 16 and horizontal register 14, as shown below.

TABLE 1

| Mode | Switch matrix turn-on position |
| --- | --- |
| 1 | Aa, Bb, Cc, Dd, Ee, Ff, Gg, Hh, Ii |
| 2 | Da, Eb, Fc, Gd, Fe, If, Ag, Bh, Ci |
| 3 | Ga, Hb, Ic, Ad, Be, Cf, Dg, Eh, Fi |
| 4 | Ab, Bc, Ca, De, Ef, Fd, Gh, Hi, Ig |
| 5 | Db, Ec, Fa, Ge, Ef, Id, Ah, Bi, Cg |
| 6 | Gb, Hc, Ia, Ae, Bf, Cd, Dh, Ei, Fg |
| 7 | Ac, Ba, Cb, Df, Ed, Fe, Gi, Hg, Ih |
| 8 | Dc, Ea, Fb, Gf, Fd, Ie, Ai, Bg, Ch |
| 9 | Gc, Ha, Ib, Af, Bd, Ce, Di, Eg, Fh |

Thereby, the two-dimensional filter section 17 executes two-dimensional filtering by inputting 3-line 3-column signals rearranged by the switch matrix 16. That is, the two-dimensional filter section 17 comprises nine multipliers 17a, 17b, . . . , and 17i to parallel input signal charges for (3 lines×3 pixels), the factor register 18 to give each prescribed filter factor to the multipliers 17a, 17b, . . . , and 17i, and the adder 19 to obtain the total sum of the signals (products) sent from the multipliers 17a, 17b, . . . , and 17i.

The multipliers 17a, 17b, ..., and 17i of the two-dimensional filter section 17 multiply 3-line 3-column signals given from the switch matrix 16 by the filter factor set in the factor register 18 respectively. The result of applying two-dimensional filtering to the signals obtained from the 3-line 3-column photoelectric sections 12 is obtained by totaling the products (factor operation results) output from the multipliers 17a, 17b, ..., and 17i with the adder 19. The filter factor set in the factor register 18 is previously set according to the contents of two-dimensional filtering. The output of the adder 19 which is the result of two-dimensional filtering is output to the outside through the output buffer 20a as the filtering output of the solid state image pick-up apparatus.

In this case, the signal from the central pixel obtained through the switch matrix 16 is directly output through the output buffer 20b as the normal signal output from the solid state image pick-up device body 11.

The row signal charge (video signal) picked up by the solid state image pick-up device body 11 and the video signal provided with the above-mentioned two-dimensional filtering are mutually synchronously obtained from the outputs of the above two systems. In other words, the two-dimensional filtering output can be obtained for the row video signal in real time.

According to the solid state image pick-up apparatus made by forming the above circuit functional sections (two-dimensional filtering function) into an IC, it is possible to obtain the picture signal provided with two-dimensional filtering together with the row picture signal as the device output in real time. Moreover, the required filtering output can directly be obtained as the device output only by previously setting the filter factor corresponding to the filtering specification to the factor register 18. Therefore, it is unnecessary to make a two-dimensional filtering circuit as part of a picture processor though the circuit has been necessary so far. Moreover, it is possible to adequately secure the real-time characteristic of the filtered signal and remarkably improve the operability.

Because it is relatively simple to integrate the two-dimensional filtering function with the solid state image pick-up device body 1 by using the current semiconductor manufacturing technique, there is the advantage that the configuration of solid state image pick-up apparatus is not very complicated. Thus, the configuration of video cameras and electronic still cameras comprising this type of solid state image pick-up apparatus can greatly be simplified.

It is also possible to configure the switch matrix 16 and two-dimensional filter section 17 as a circuit element independently of the solid state image pick-up device body 11. Even if they are configured as the above circuit element, it is only necessary to install the signal conductors connecting the solid state image pick-up device body 11 with the switch matrix 16 according to the number of pixels to execute two-dimensional filtering and similarly execute signal reading control for the photoelectric sections 12 arranged as a matrix signals. Therefore, the filtering efficiency is greatly improved and the filtering control system can greatly be simplified.

In the above-mentioned third embodiment, signal conductors are replaced by the switch matrix 16 using (9×9) switch elements. However, it is also possible to configure the switch matrix 16 as shown in the fourth embodiment of FIG. 7. That is, the signal charges from the photoelectric sections 12 are read every 3 lines and 3 columns. Therefore, the switch matrix 16 is configured into the first switch matrix group 16d and the second switch matrix group 16e as shown in FIG. 7. Then, single conductors are replaced every three columns of nine signal reading conductors 13b by the first switch matrix group 16d and signal conductors for three lines are replaced by the second switch matrix group 16e.

In this case, it is necessary to switch on the first switch matrix group 16d according to the line selecting mode of the vertical register 13 as shown in Table 2 and the second switch matrix group 16e according to the column selecting mode of the horizontal register 14 as shown in Table 3.

TABLE 2

| Mode | Switch-on position |
|---|---|
| 1 | Xx, Yy, Zz |
| 2 | Yx, Zy, Xz |
| 3 | Zx, Xy, Yz |

TABLE 3

| Mode | Switch-on position |
|---|---|
| 1 | Nn, Mm, Ll |
| 2 | Mn, Lm, Nl |
| 3 | Ln, Nm, Ml |

By configuring the switch matrix 16 like the above mentioned, the number of MOS switches used for the matrix can be decreased. Therefore, it is very effective to simplify the configuration. Also, by configuring the switch matrix 16 as shown in FIG. 7, it is possible to control the first switch matrix group 16d according to the output of the vertical register 13 and the second switch matrix group 16e according to the output of the horizontal register 14. Therefore, the effect is obtained that the control system can simply be made.

The following is the description of a concrete example to execute 3×3 two-dimensional filtering.

Two-dimensional filtering is executed by multiplying the prescribed areas (3×3 in this case) by the prescribed factors and totaling the products.

Figure 8:
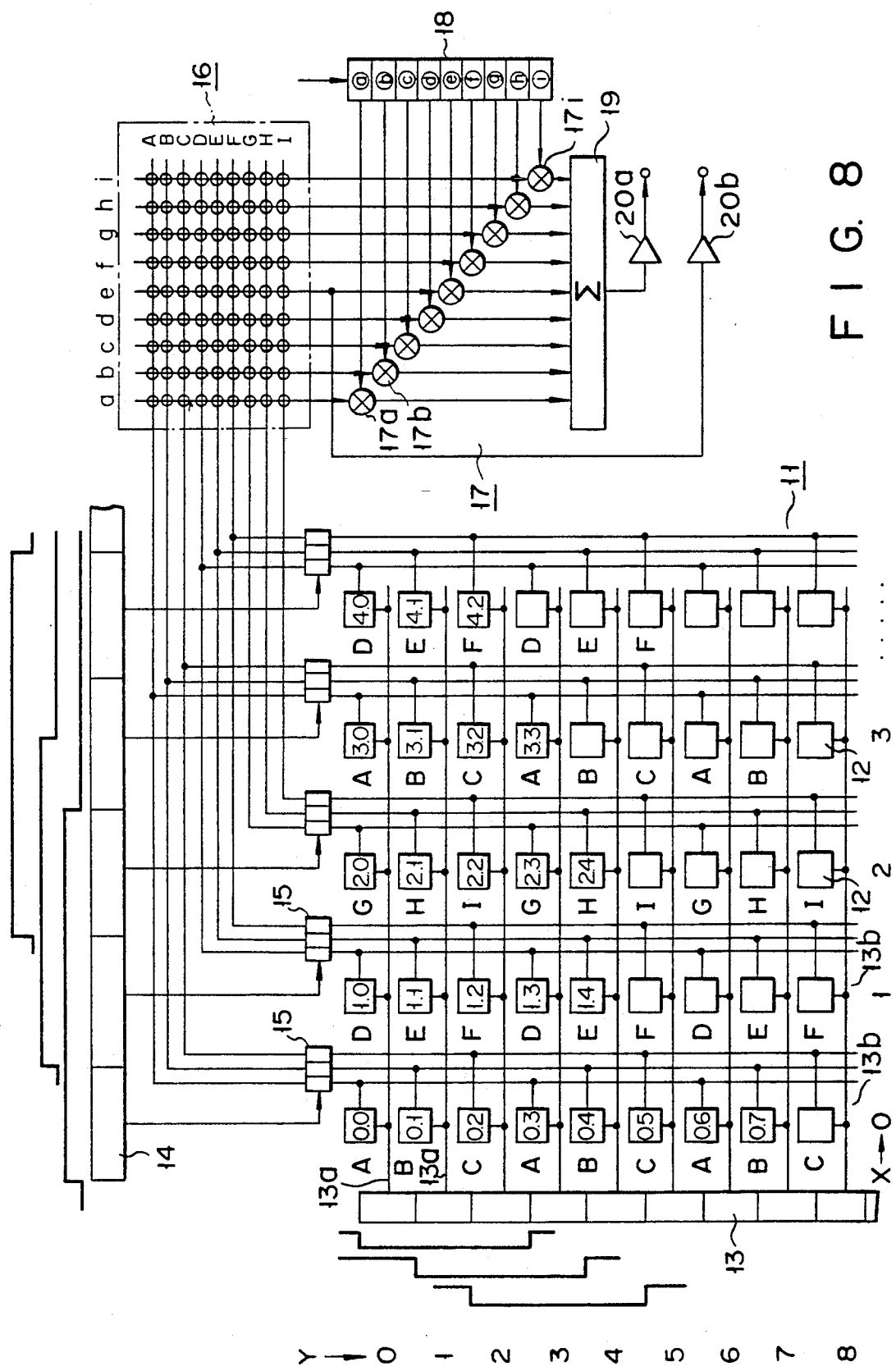

In FIG. 8, numerical characters are shown in each photoelectric section 2 in the XY direction in order to clarify the pixel position by assuming the top left as (0, 0). The alphabetical characters A through I beside the numerical characters show a connected reading conductor of nine conductors respectively.

FIGS. 9A and 9B describe the 3×3 two-dimensional filter for D and C among A through I.

D (0, 0) through D (2, 2) in FIG. 8 are the data to be filtered.

In FIG. 8, the output conductors "a" through "i" of the switch matrix section 16 correspond to them.

C (0, 0) through C (2, 2) in FIG. 9B show factors.

FIGS. 10A and 10B show concrete values to emphasize the edge. The two-dimensional filtering in FIGS. 9A and 9B is expressed as the following formula.

$$\sum_{x=0}^{2} \sum_{y=0}^{2} D(x,y)\, C(x,y)$$

In this case, fixed factors are loaded in the register 18 which provides factors. However, the pixels input to the reading conductors A through I should be replaced to obtain the product with the prescribed factor because the reading position changes. The switch matrix section 16 executes the replacement.

The following is the description of actual operations of the switch matrix section 16. When assuming the noticed pixel to be filtered as (1, 1), the area necessary for filtering includes nine pixels of (0, 0) through (2, 2). To lead this to the output, the horizontal register 14 gives the signal to switch on the first through third lines from the left. The output register gives the signal to switch on the first through third columns from the top. When the above signals are given, the following pixel signals appear in the output conductors. Table 4 shows the factors necessary for this case.

TABLE 4

| Output conductor | | Pixel | Factor | On-switch |
|---|---|---|---|---|
| A | → | 0.0 | a | Aa |
| B | → | 0.1 | b | Bb |
| C | → | 0.2 | c | Cc |
| D | → | 1.0 | d | Dd |
| E | → | 1.1 | e | Ee |
| F | → | 1.2 | f | Ff |
| G | → | 2.0 | g | Gg |
| H | → | 2.1 | h | Hh |
| I | → | 2.2 | i | Ii |

Figure 11:
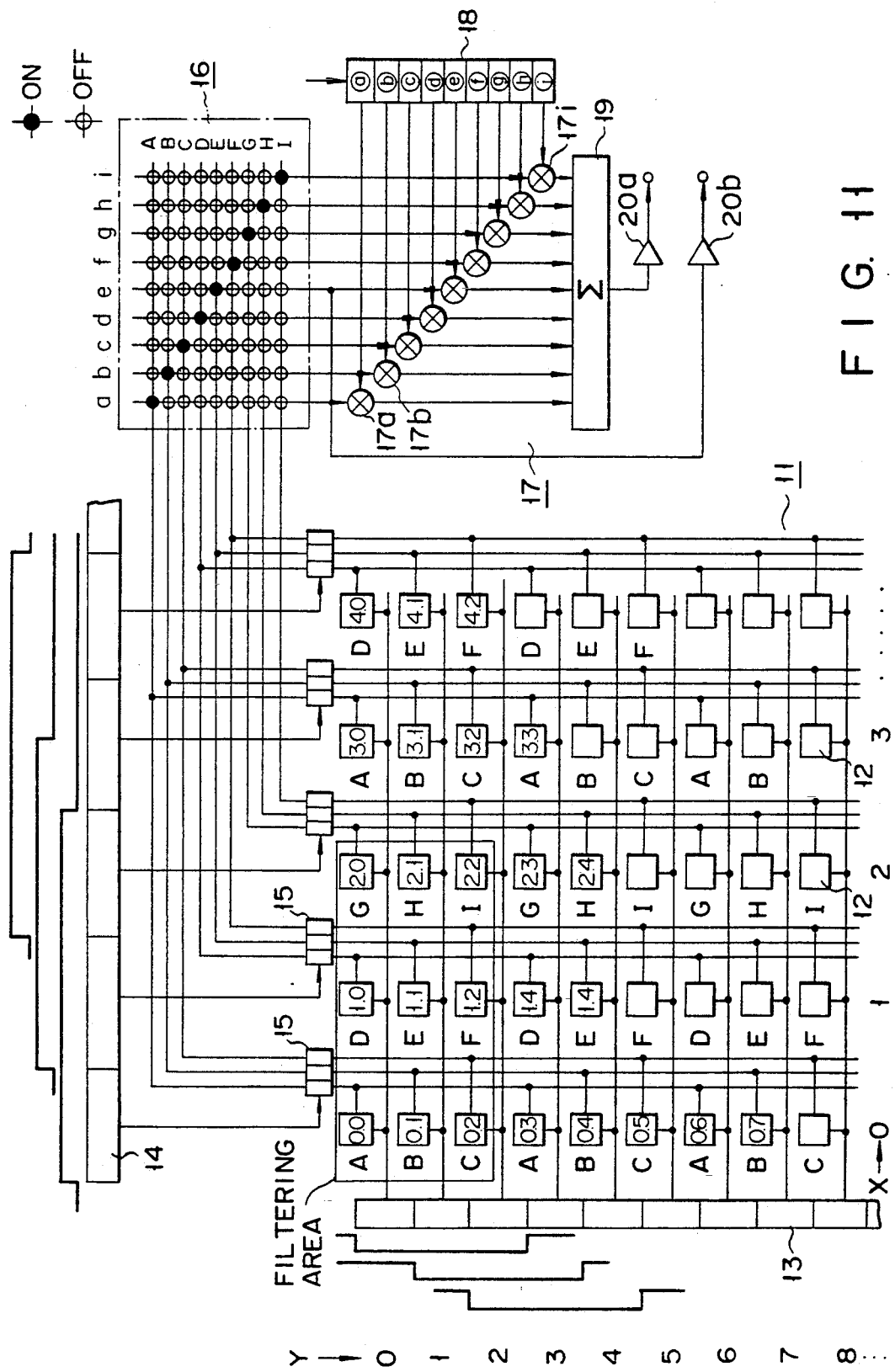

As shown in FIG. 11, correct calculation results are obtained because pixels coincide with factors by closing the switches with a black circle.

Figure 12:
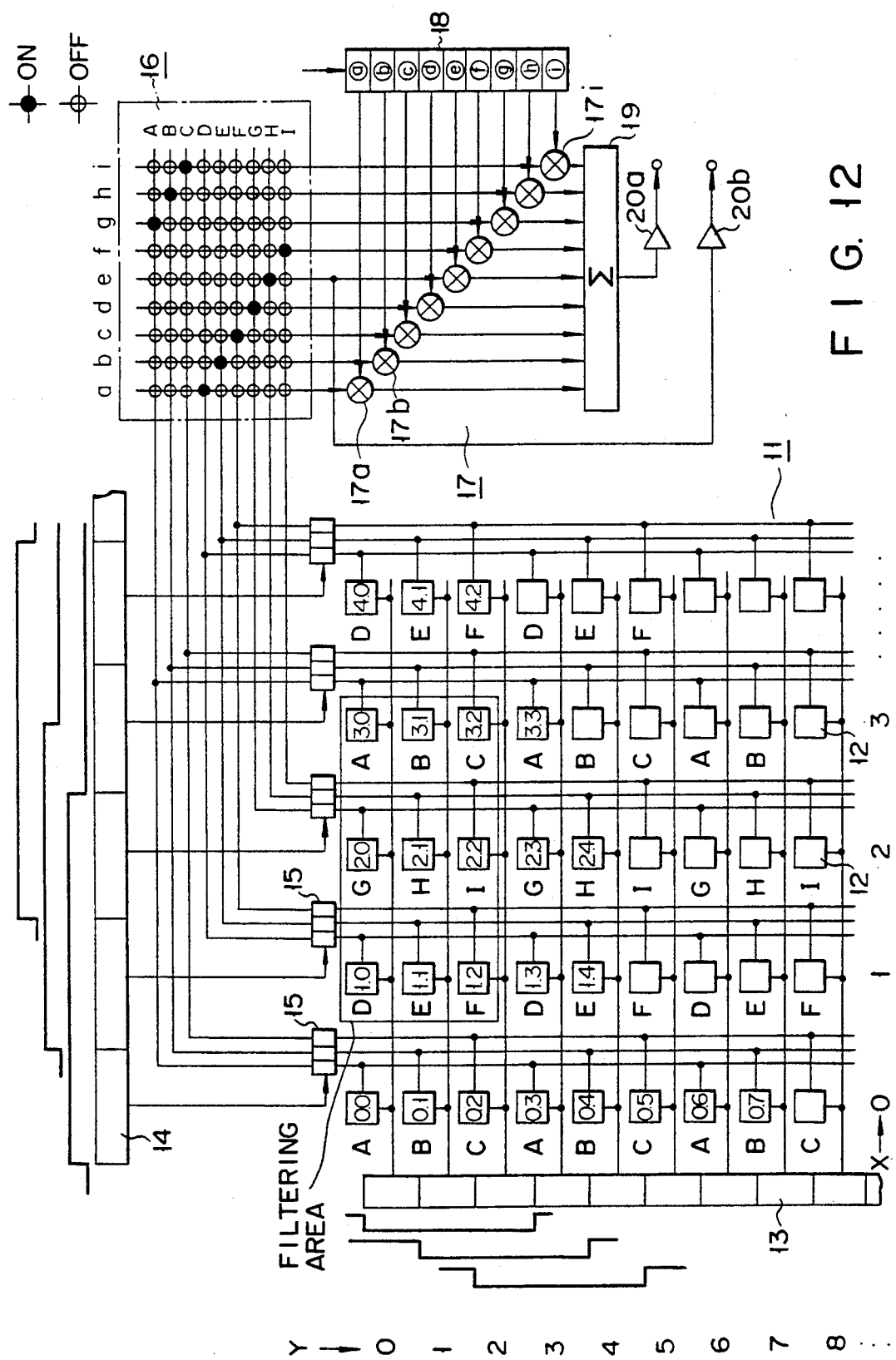

FIG. 12 shows an example when the noticed pixel is (2, 1). In this case, the necessary area includes (1, 0) through (2, 2). Therefore, the horizontal register 14 is provided with the signal to switch on the second through fourth lines from the left and the vertical register 13 with the signal to switch on the first through third columns.

Table 5 shows the corresponding pixel, required factor, and switch-on position in this case.

TABLE 5

| Output conductor | Pixel | Factor | Switch-on position |
|---|---|---|---|
| A | 3.0 | g | Ag |
| B | 3.1 | h | Bh |
| C | 3.2 | i | Ci |
| D | 1.0 | a | Da |
| E | 1.1 | b | Eb |
| F | 1.2 | c | Fc |
| G | 2.0 | d | Gd |
| H | 2.1 | e | He |
| I | 2.2 | f | If |

Thus, by sequentially scanning noticed pixels, the relation between an output conductor and a pixel changes. Therefore, the switch matrix section 16 replaces and corrects positions so that multiplication with correct factors can be executed.

The solid state image pick-up device of the present invention is not restricted to the above-mentioned third and fourth embodiments. Though the third and fourth embodiments are described by assuming that two-dimensional filtering is applied between the signal charges for (3 lines×3 pixels), two-dimensional filtering for ("n" lines×"m" pixels) is also possible in general. It is also possible to previously set the filter factors for two-dimensional filtering as ROM data if the filtering specification is fixed. Moreover, it is possible to reverse the relation between the input and output of the switch matrix in FIG. 7. The present invention can be executed in various forms as long as they follow the gist of the invention.

As mentioned above, according to the third and fourth embodiments of the present invention, it is possible to simply and effectively execute two-dimensional filtering for the signal charges (picture signals) read from the photoelectric sections (solid state image pick-up device body) and very simply control reading of signals from the photoelectric sections for filtering. It is also possible to realize a solid state image pick-up apparatus capable of obtaining the filtering output in real time by integrating the two-dimensional filtering function with the photoelectric sections. Moreover, it is possible to configure a solid state image pick-up apparatus so that the required filtering output can be obtained by very effectively incorporating the two-dimensional filtering function. As the result, great effect for practical use can be obtained because the configuration of video cameras and electronic still cameras using this type of solid state image pick-up device and their treatability can greatly be simplified.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A solid state image pick-up device comprising:
    a solid state image pick-up device body comprising:
    a plurality of semiconductor photoelectric sections arranged as a matrix having several pixels to store signal charges corresponding to the quantity of incident light;
    a parallel transfer means corresponding to said pixels to parallel transfer and output said signal charges stored in said semiconductor photoelectric sections in lines; and
    a two-dimensional filtering means integrated in the output section of said solid state image pick-up device body for directly applying a predetermined two-dimensional filtering to said signal charges output from said solid state image pick-up device body, said filtering means including a plurality of stage transfer register means for storing the signal charges parallel transferred in lines by said parallel transfer means in "n" consecutive lines and to serially transfer and output the signal charges stored in each line.

2. A solid state image pick-up device according to claim 1, wherein said two-dimensional filtering means comprises:
    a plurality of delaying means for delaying the signal charges serially transferred and output from said several-stage transfer means and parallel output "m" consecutive pixels to each line;
    a plurality of multiplying means for multiplying each signal charge for "n" stages and "m" pixels output from said several delaying means; and
    adding means for adding products output from said plurality of multiplying means.

3. A solid state image pick-up device according to claim 2, wherein said plurality of transfer register means comprise parallel transfer registers for "n" lines to cyclically and serially transfer and output said parallel-transferred signal charges for one line and parallel transfer the signal charges for one line to the next stage synchronously with reading of the signal charges for each line sent from said semiconductor photoelectric sections.

4. A solid state image pick-up device according to claim 2, wherein said plurality of transfer register means comprise transfer registers for several lines serially connected.

5. A solid state image pick-up device according to claim 1, wherein said parallel transfer means includes a plurality of vertical transfer registers arranged along each column of said plurality of semiconductor photoelectric sections arranged as a matrix and a plurality of transfer gates formed between said plurality of semiconductor photoelectric sections and said plurality of vertical transfer registers.

6. A solid state image pick-up device according to claim 2, wherein said delaying means includes sample-hold circuits.

7. A solid state image pick-up device according to claim 1, wherein said two-dimensional filtering means includes means for outputting normal signals together with filtering output.

8. A solid state image pick-up device according to claim 2, wherein said two-dimensional filtering means includes a factor register to which a predetermined filter factor is previously set.

9. A solid state image pick-up apparatus comprising:
a plurality of photoelectric sections arranged as a matrix to form a photoelectric surface and provided with the function to hold signal charges independently of reading the signal charges;

photoelectric section designating means for selectively designating the line positions every "n" consecutive lines of said photoelectric sections by shifting over the lines one by one and selectively designate the column positions every "m" consecutive columns of said photoelectric sections by shifting over the columns one by one;

(n×m) signal reading conductors for parallelly reading the signals corresponding to the signal charges stored in each photoelectric section for "n" lines and "m" columns designated by said photoelectric section designating means;

a switch matrix for rearranging the signals from each photoelectric section for "n" lines and "m" columns read through said (n×m) signal reading conductors to the sequence according to the positional relation of said "n"-line "m"-column photoelectric sections;

a plurality of multipliers for multiplying each signal for said "n" lines and "m" columns obtained through said switch matrix by each prescribed factor; and an adder for adding products obtained by said plurality of multipliers.

10. A solid state image pick-up apparatus according to claim 9, wherein said plurality of photoelectric sections, said photoelectric section designating means, said (n×m) signal reading conductors, said switch matrix, said plurality of multipliers, and said adder are integrated in the same semiconductor substrate.

* * * * *